US010118519B2

(12) United States Patent
Han et al.

(10) Patent No.: US 10,118,519 B2
(45) Date of Patent: Nov. 6, 2018

(54) COOLING STRUCTURE OF SEAT AND ELECTRONIC MODULE

(71) Applicant: Hyundai Motor Company, Seoul (KR)

(72) Inventors: Jongwan Han, Seoul (KR); Yeon Man Jeong, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 499 days.

(21) Appl. No.: 14/942,552

(22) Filed: Nov. 16, 2015

(65) Prior Publication Data

US 2016/0362028 A1 Dec. 15, 2016

(30) Foreign Application Priority Data

Jun. 15, 2015 (KR) ........................ 10-2015-0084254

(51) Int. Cl.

*H01M 10/613* (2014.01)
*H01M 10/667* (2014.01)
*H01M 10/625* (2014.01)
*H01M 10/6563* (2014.01)
*B60N 2/56* (2006.01)
*H01M 10/66* (2014.01)

(52) U.S. Cl.

CPC ........ *B60N 2/5657* (2013.01); *H01M 10/613* (2015.04); *H01M 10/625* (2015.04); *H01M 10/6563* (2015.04); *H01M 10/66* (2015.04); *H01M 2220/20* (2013.01)

(58) Field of Classification Search

None
See application file for complete search history.

(56) References Cited

U.S. PATENT DOCUMENTS

| | | | | |
|---|---|---|---|---|
| 7,079,379 | B2 | 7/2006 | Yamaguchi et al. | |
| 2005/0188849 | A1 * | 9/2005 | Yoneno .................. | A47C 7/744 96/143 |
| 2014/0302763 | A1 | 10/2014 | Kitaguchi et al. | |

FOREIGN PATENT DOCUMENTS

| | | | |
|---|---|---|---|
| JP | 2004331024 | * | 11/2004 |
| JP | 2006-168681 | A | 6/2006 |
| JP | 2008-044424 | A | 2/2008 |
| JP | 2008-174085 | A | 7/2008 |
| JP | 5353590 | B2 | 11/2013 |
| KR | 10-2013-0044878 | A | 5/2013 |

* cited by examiner

*Primary Examiner* — Ladan Mohaddes

(74) *Attorney, Agent, or Firm* — Mintz Levin Cohn Ferris Glovsky and Popeo, P.C.; Peter F. Corless

(57) ABSTRACT

A cooling structure of a seat and an electronic module is provided. The cooling structure includes a cooling fan module that is mounted at a lower portion of the seat and generates air flow. An electronic module operating as a heating element is disposed at a lower portion of the cooling fan module. A flow path control valve is disposed at an upper portion of the cooling fan module to selectively convert a flow direction of air flowing in towards an upper end of the cooling fan module. The electronic module is thus continuously cooled and the seat is selectively cooled while the cooling fan module operates.

10 Claims, 9 Drawing Sheets

COOLING STRUCTURE OF SEAT AND ELECTRONIC MODULE

CROSS-REFERENCE TO RELATED APPLICATION

The present application claims priority of Korean Patent Application Number 10-2015-0084254 filed on Jun. 15, 2015, the entire contents of which application are incorporated herein for all purposes by this reference.

BACKGROUND (a) Field of the Invention

The present invention relates to a cooling structure, and more particularly, to a cooling structure that cools both a seat and an electronic module.

(b) Description of the Related Art

Low voltage battery systems may be used in vehicles such as a mild hybrid electrical vehicle (MHEV) that is capable of achieving low fuel consumption and environmentally-friendliness. A vehicle equipped with an assistant 12V battery system can exhibit an excellent Stop & Start function and a 48V battery system can provide an additional power train characteristic such as assisting output. Torque assistance and regenerative braking are also performed and fuel consumption may be improved using a direct-current/direct-current (DC/DC) converter and an additional 48V battery.

Further, down-sizing an electronic module having the parts mentioned above has been developed and thus, the installation thereof within the electronic module has been simplified. In general, electronic modules used in a vehicle may comprise a DC/DC converter and a 12V or a 48V battery, etc. and be configured according to purposes. In the related art, electronic modules were configured by additional cooling fans being respectively coupled with electronic parts to cool such electronic parts as the parts mentioned above. As a result, when installing electronic modules within a vehicle, cost increases and inside space is limited by an additional cooling fan configuration.

FIG. 1 is a view of a prior electronic module according to the related art. In particular, FIG. 1 shows that inside space are limited and cost and weight are increased due to the required additional cooling fan combined for cooling the electronic module even though down-sizing of an electronic module, which is used for improving fuel consumption, is effectively done in an environmentally-friendly vehicle.

The above information disclosed in this section is merely for enhancement of understanding of the background of the invention and therefore it may contain information that does not form the prior art that is already known in this country to a person of ordinary skill in the art.

SUMMARY

Various aspects of the present invention are directed to providing a cooling structure of a seat and an electronic module, which reduces cost and weight of the electronic module while maintaining or increasing commercial value of inside space, by properly configuring a seat cooling device.

In various aspects of the present invention, a cooling structure of a seat and an electronic module may include a cooling fan module mounted at a lower portion of the seat and configured to generate air flow, an electronic module which is a heating element, the electronic module disposed at a lower portion of the cooling fan module, and a flow path control valve disposed at an upper portion of the cooling fan module to selectively convert a flow direction of air flowing in towards an upper end of the cooling fan module, wherein the electronic module may be continuously cooled and the seat may be selectively cooled while the cooling fan module operates.

The cooling structure may further include a corrugated duct with an inlet connected to a lower end of the cooling fan module and an outlet disposed towards the electronic module. In addition, the cooling structure may include a matching cover mounted at a lower end portion of the seat and having a matching aperture formed to be coupled with an upper end portion of the flow path control valve.

The flow path control valve may include a hollow upper cover having at least one first penetration aperture formed at an upper surface thereof and at least one second penetration aperture formed at a side external circumferential surface thereof, a hollow rotating portion having at least one third penetration aperture formed at an upper surface thereof that corresponds to the at least one first penetration aperture, having at least one fourth penetration aperture formed at a side external circumferential surface thereof that corresponds to the at least one second penetration aperture, and rotating on a height direction of a vehicle as a predetermined angle, and a rotating shaft mounted within the rotating portion to rotate the rotating portion, and any one of the upper cover and the rotating portion may be disposed inside the other.

In particular, the cooling structure may further include a matching cover mounted at a lower end portion of the seat and having a matching aperture formed to be coupled with an upper end portion of the upper cover. The rotating shaft may be configured to rotate on a length direction thereof to open the at least one second penetration aperture when the at least one first penetration aperture is closed and to close the at least one second penetration aperture when the at least one first penetration aperture is opened. The seat and the electronic module may be simultaneously cooled when the at least one first penetration aperture is opened, and the electronic module may be cooled when the at least one second penetration aperture is opened.

The at least one first penetration aperture and the at least one third penetration aperture may be configured such that when the rotating portion rotates as the predetermined angle from a condition in which the at least one first penetration aperture is completely opened, the at least one first penetration aperture may be closed by the rotating portion. The at least one second penetration aperture and the at least one fourth penetration aperture may be configured such that when the rotating portion rotates as the predetermined angle from a condition in which the at least one second penetration aperture is completely opened, the at least one second penetration aperture may be closed by the rotating portion. The upper cover and the rotating portion may respectively have cylindrical shapes. The flow path control valve may further include a lower cover fixedly mounted at a lower end of the upper cover and configured to support a lower end portion of the rotating shaft, and the lower cover may be coupled to an upper end of the cooling fan module.

BRIEF DESCRIPTION OF THE DRAWINGS

The above and other features of the present invention will now be described in detail with reference to exemplary embodiments thereof illustrated by the accompanying drawings which are given herein below by way of illustration only, and thus are not limitative of the present invention, and wherein.

DETAILED DESCRIPTION

Figure 1:
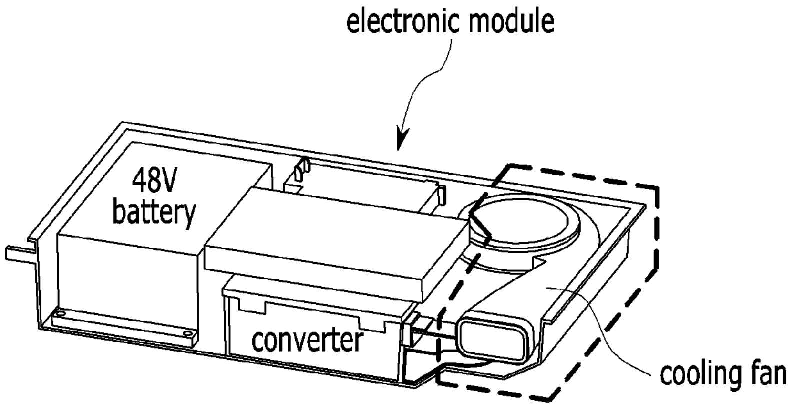
FIG. 1 is a view of a prior electronic module according to the related art.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Reference will now be made in detail to various exemplary embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

However, parts which are not related with the description are omitted for clearly describing the exemplary embodiments of the present invention and like reference numerals refer to like or similar elements throughout the specification. In the following description, dividing names of components into first, second, and the like is to divide the names because the names of the components are the same as each other and an order thereof is not particularly limited.

Figure 2:
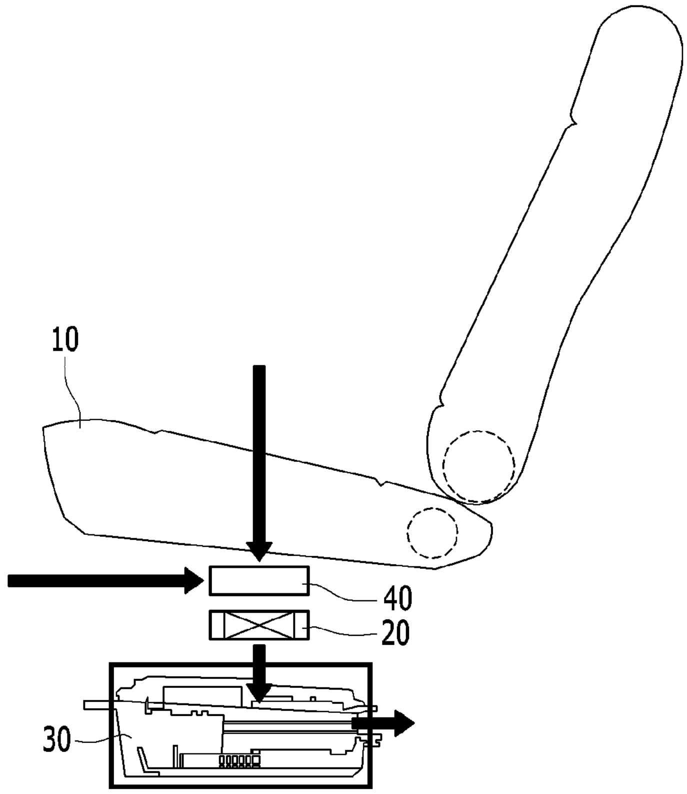
FIG. 2 is a side view of an exemplary cooling structure of a seat and an electronic module according to an exemplary embodiment of the present invention.
Figure 3:
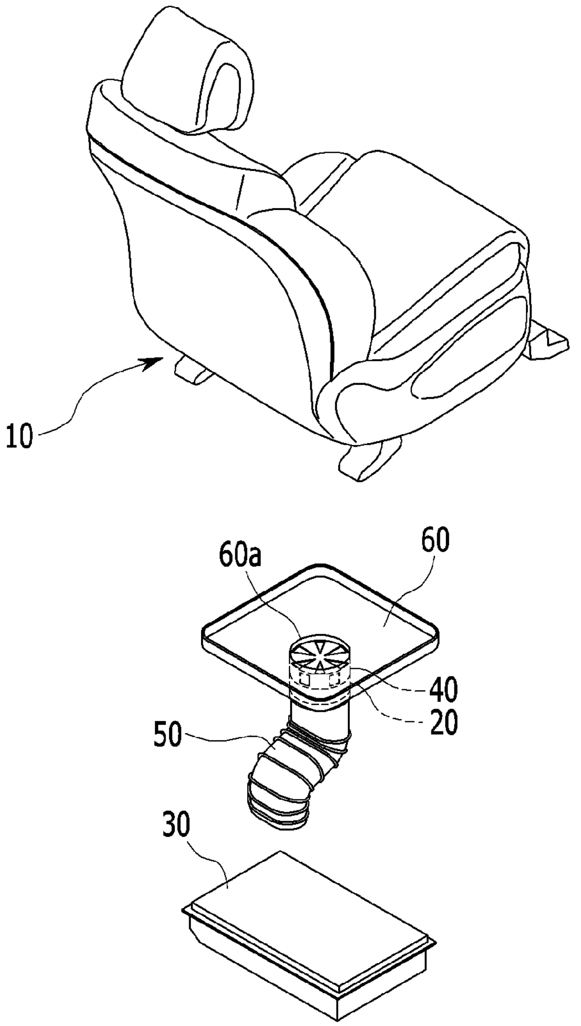
FIG. 3 is a detailed view of an exemplary cooling structure of a seat and an electronic module according to an exemplary embodiment of the present invention.

FIG. 1 is a view of a prior electronic module according to the related art. In an exemplary cooling structure of a seat and an electronic module according to the present invention, a cooling fan of FIG. 1 may be omitted. FIG. 2 is a side view of an exemplary cooling structure of a seat and an electronic module according to an exemplary embodiment the present invention. FIG. 3 is a detailed view of an exemplary cooling structure of a seat and an electronic module according to an exemplary embodiment the present invention.

Referring to FIG. 2 and FIG. 3, an exemplary cooling structure of a seat and an electronic module according to an exemplary embodiment the present invention may include a cooling fan module 20 mounted at a lower portion of the seat 10 and configured to generate air flow, an electronic module 30 operating as a heating element and disposed at a lower portion of the cooling fan module 20, and a flow path control valve 40 disposed at an upper portion of the cooling fan module 20 to selectively convert a flow direction of air flowing in towards an upper end of the cooling fan module 20.

A direction of air flow which the cooling fan module 20 generates may be converted from up and down (e.g., vertical) directions to left and right (e.g., horizontal) directions, on a drawing, by the flow path control valve 40. In other words, the seat 10 may be cooled by air flow in vertical directions and the seat 10 may be prevented from being cooled by air flow in horizontal directions. As a result, the electronic module 30 may be continuously cooled and the seat 10 may be selectively cooled while the cooling fan module 20 operates, in the cooling structure. Particularly, the seat 10 may be cooled when a driver selects a cooling selection (e.g., a cooling selection is received or input by the driver). The electronic module 30 may be continuously cooled since the electronic module 30 may be disposed to meet air flow however the flow path control valve 40 converts a direction of the air flow.

Detailed explanation will be omitted because the cooling fan module 20 is well known to a skilled person in the art as a device generally used in a vehicle. It is also well known that air flow may be reversed based on a rotating direction of the cooling fan. In addition, an exemplary cooling structure of a seat and an electronic module according to the present invention may further include a corrugated duct 50 having inlet connected to a lower end of the cooling fan module 20 and an outlet disposed towards the electronic module 30.

Accordingly, an outlet direction of air flow may be fixed at a portion of the electronic module 30, where cooling is required or requested, even when a position of the seat 10 is changed in a length direction of a vehicle. However, the corrugated duct 50 may not be included based on a structure of the electronic module 30 and an outlet of the cooling fan module 20 may be directly provided for the electronic module 30. Further, the cooling structure may further include a matching cover 60 mounted at a lower end portion of the seat 10 and having a matching aperture 60*a* formed to be coupled with an upper end portion of the flow path control valve 40.

Figure 4:
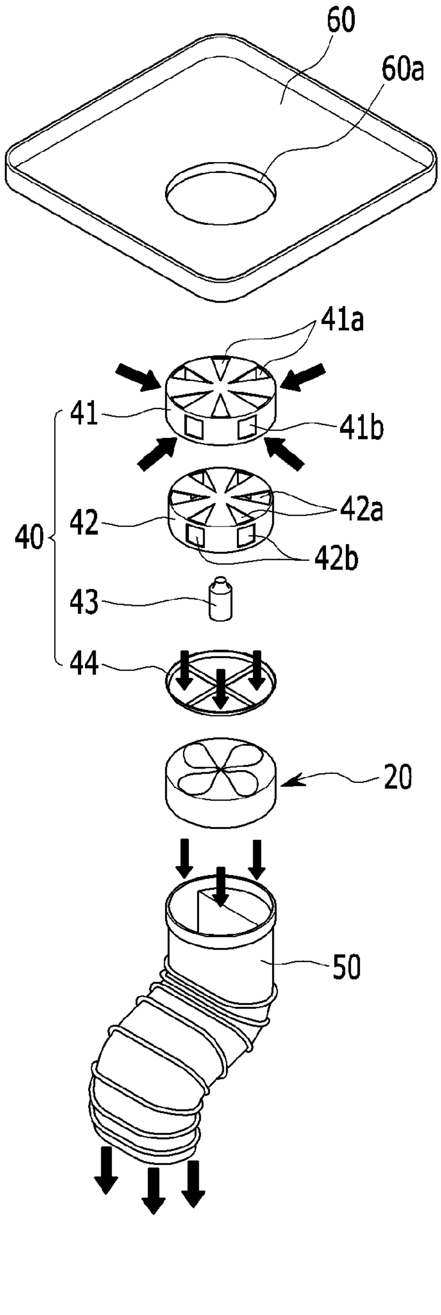
FIG. 4 is a detailed view illustrating a case (a first operating condition) in which only an electronic module is cooled in an exemplary cooling structure according to an exemplary embodiment of the present invention.
Figure 5:
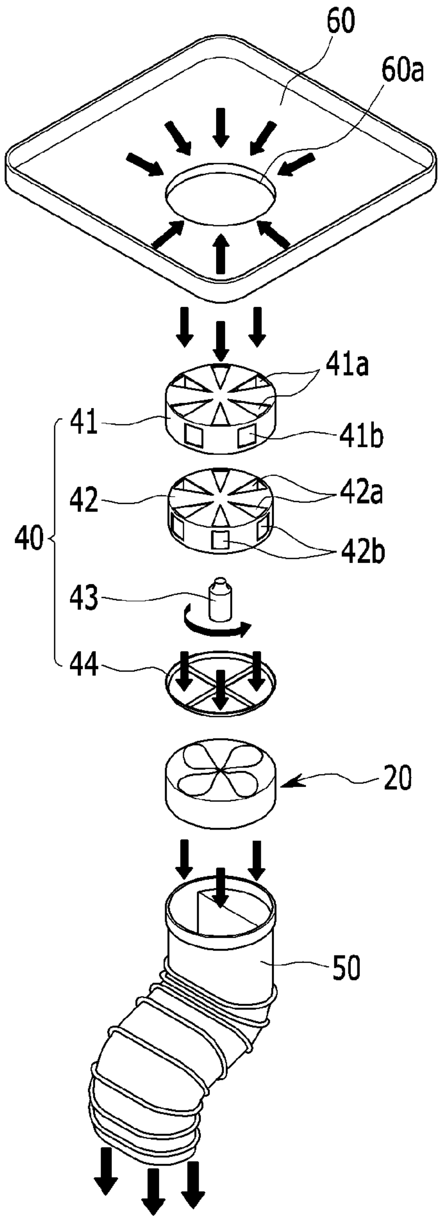
FIG. 5 is a detailed view illustrating a case (a second operating condition) in which both a seat and an electronic module are cooled in an exemplary cooling structure according to an exemplary embodiment of the present invention.

FIG. 3 shows an exemplary embodiment of a cooling structure of a seat and an electronic module. FIG. 4 is a detailed view illustrating a first operating condition in which only an electronic module is cooled in an exemplary cooling structure according to the present invention. FIG. 5 is a detailed view illustrating a second operating condition in which both a seat and an electronic module are cooled in an exemplary cooling structure according to the present invention.

Referring FIG. 4 and FIG. 5, the flow path control valve 40 may include a hollow upper cover 41 having at least one first penetration aperture 41*a* formed at an upper surface thereof and at least one second penetration aperture 41*b* formed at a side external circumferential surface thereof, a hollow rotating portion 42 having at least one third penetration aperture 42*a* formed at an upper surface thereof that corresponds to the at least one first penetration aperture 41*a,* having at least one fourth penetration aperture 42*b* formed at a side external circumferential surface thereof that corresponds to the at least one second penetration aperture 41*b,* and configured to rotate on a height direction of a vehicle as a predetermined angle (e.g., rotate at a predetermined angle), and a rotating shaft 43 mounted within the rotating portion 42 to rotate the rotating portion 42. Further, any one of the upper cover 41 and the rotating portion 42 may be disposed inside the other.

In FIG. 4 and FIG. 5, an exemplary embodiment in which the rotating portion 42 is disposed inside the upper cover 41 is illustrated. In the cooling structure, the rotating shaft 43 may be configured to rotate on a length direction thereof as the predetermined angle to open the at least one second penetration aperture 41*b* when the at least one first penetration aperture 41*a* is closed and to close the at least one second penetration aperture 41*b* when the at least one first penetration aperture 41*a* is opened.

The former is a first operating condition illustrated in FIG. 4 and the latter is a second operating condition illustrated in FIG. 5. Arrows indicated in FIG. 4 and FIG. 5 indicate air flow generated by a cooling fan module 20 and FIG. 4 and FIG. 5 illustrate a principle of air flow direction being converted by the flow path control valve 40. In other words, the seat 10 and the electronic module 30 may be cooled simultaneously when the at least one first penetration aperture 41*a* is opened, which is the second operating condition, and only the electronic module 30 may be cooled when the at least one second penetration aperture 41*b* is opened, which is the first operating condition. Further, the cooling structure may include a matching cover 60 mounted at a lower end portion of the seat 10 and having a matching aperture 60*a* formed to be coupled with an upper end portion of the upper cover 41.

Exemplary embodiments of FIG. 4 and FIG. 5 illustrate the matching cover 60. The upper cover 41 and the rotating portion 42 may respectively have cylindrical shapes. Accordingly, an upper surface and a side external circumferential surface of each of the upper cover 41 and the rotating portion 42 may be perpendicular to each other as shown in FIG. 4 and FIG. 5. However, exemplary embodiments are not limited to the above shapes and any type of shape may be allowed as long as the flow path control valve 40 is capable of converting an air flow direction. In other words, a side external circumferential surface of the flow path control valve 40 may have a trapezoidal shape, on a side view of the flow path control valve 40. Accordingly, an upper surface and a side external circumferential surface of the flow path control valve 40 may not be perpendicular to each other.

In addition, the flow path control valve 40 may further include a lower cover 44 fixedly mounted at a lower end of the upper cover 41 and configured to support a lower end portion of the rotating shaft 43 and the lower cover 44 may be coupled to an upper end of the cooling fan module 20. The lower cover 44 may be configured to support the rotating shaft 43 and simultaneously couple the cooling fan module 20 and the flow path control valve 40. The rotating shaft 43 may be configured to rotate using a motor and operate as an actuator of the rotating portion 42. Detailed explanation will be omitted since this type of mechanism is well known to a skilled person in this art.

Figure 6:
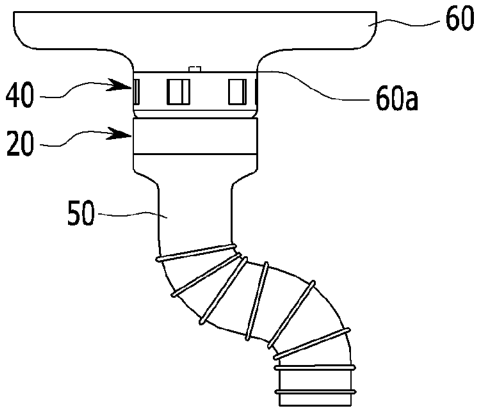
FIG. 6 is a side view showing main parts of an exemplary cooling structure according to an exemplary embodiment of the present invention.
Figure 7:
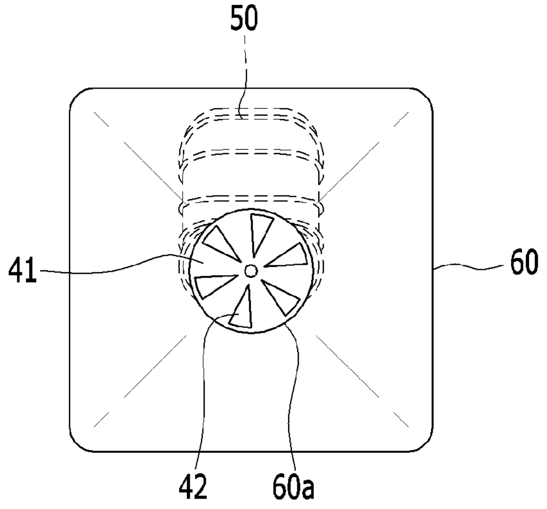
FIG. 7 is a top plan view showing main parts of an exemplary cooling structure according to an exemplary embodiment of the present invention.
Figure 8:
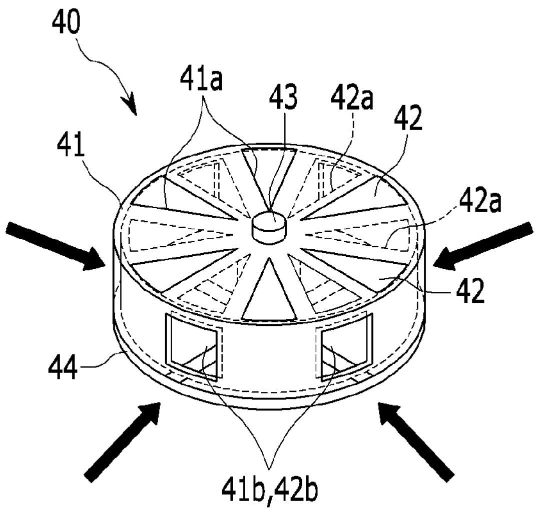
FIG. 8 is a view illustrating a first operating condition of an exemplary flow path control valve according to an exemplary embodiment of the present invention.
Figure 9:
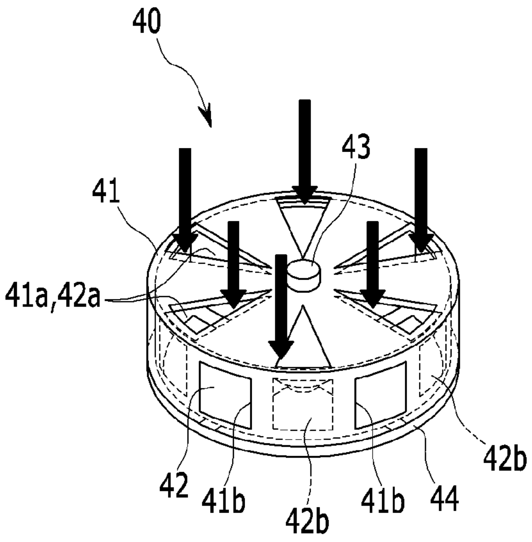
FIG. 9 is a view illustrating a second operating condition of an exemplary flow path control valve according to an exemplary embodiment of the present invention.

FIG. 6 is a side view showing main parts of an exemplary cooling structure according to an exemplary embodiment of the present invention. FIG. 7 is a top plan view showing main parts of an exemplary cooling structure according to an exemplary embodiment of the present invention. Referring to FIG. 6 and FIG. 7, coupling relations among components of the cooling structure may be easily understood. FIG. 8 is a view illustrating a first operating condition of an exemplary flow path control valve according to an exemplary embodiment of the present invention. FIG. 9 is a view illustrating a second operating condition of an exemplary flow path control valve according to an exemplary embodiment of the present invention.

Referring to FIG. 8 and FIG. 9, the at least one first penetration aperture 41*a* may be closed by the rotating portion 42, which is the first operating condition, when the rotating portion 42 rotates as the predetermined angle from a condition in which the at least one first penetration aperture 41*a* is completely opened, which is the second operating condition. In exemplary embodiments of FIG. 8 and FIG. 9, the predetermined angle may be 30 degrees which is obtained by 360 degrees being divided 12 (numbers of apertures).

That is, if the rotating portion 42 rotates as the predetermined angle from the second operating condition of FIG. 9, the operating condition becomes the first operating condition of FIG. 8. In this case, the at least one second penetration aperture 41*b* is opened as shown in FIG. 8. The at least one second penetration aperture 41*b* and the at least one fourth penetration aperture 42*b* may be configured such that the at least one second penetration aperture 41*b* is closed by the rotating portion 42, which is the second operating condition, when the rotating portion 42 rotates as the predetermined angle from a condition in which the at least one second penetration aperture 41*b* is completely opened, which is the first operating condition.

In other words, when the rotating portion 42 rotates as the predetermined angle from the first operating condition of FIG. 8, the operating condition becomes the second operating condition of FIG. 9. In particular, the at least one first penetration aperture 41*a* may be opened as shown in FIG. 9. As a result, the conversion of an air flow direction executed by the flow path control valve 40 may be secured in an exemplary cooling structure according to an exemplary embodiment of the present invention.

As explained in detail, a cooling fan module having been additionally mounted within an electronic module may be omitted by a proper improvement of a seat cooling apparatus, thereby marketability of inside space may be improved, and simultaneously cost and weight of an electronic module may be reduced according to the present invention.

While this invention has been described in connection with what is presently considered to be exemplary embodiments, it is to be understood that the invention is not limited to the disclosed exemplary embodiments, but, on the contrary, is intended to cover various modifications and equivalent arrangements included within the spirit and scope of the appended claims.

What is claimed is:

1. A cooling structure of a seat and an electronic module, comprising:

a cooling fan module mounted at a lower portion of the seat and configured to generate air flow;

an electronic module operating as a heating element and disposed at a lower portion of the cooling fan module; and a flow path control valve disposed at an upper portion of the cooling fan module to selectively convert a flow direction of air flowing in towards an upper end of the cooling fan module, wherein the electronic module is continuously cooled and the seat is selectively cooled while the cooling fan module operates, wherein the flow path control valve comprises:

a hollow upper cover having at least one first penetration aperture formed at an upper surface thereof and at least one second penetration aperture formed at a side external circumferential surface thereof;

a hollow rotating portion having at least one third penetration aperture formed at an upper surface thereof that corresponds to the at least one first penetration aperture, having at least one fourth penetration aperture formed at a side external circumferential surface thereof that corresponds to the at least one second penetration aperture, and configured to rotate on a height direction of a vehicle as a predetermined angle; and a rotating shaft mounted within the rotating portion to rotate the rotating portion, and wherein any one of the upper cover and the rotating portion is disposed inside the other.

2. The cooling structure of claim 1, further comprising:

a corrugated duct having an inlet connected to a lower end of the cooling fan module and an outlet disposed towards the electronic module.

3. The cooling structure of claim 1, further comprising:

a matching cover mounted at a lower end portion of the seat and including a matching aperture formed to be coupled with an upper end portion of the flow path control valve.

4. The cooling structure of claim 1, further comprising:

a matching cover mounted at a lower end portion of the seat and including a matching aperture formed to be coupled with an upper end portion of the upper cover.

5. The cooling structure of claim 1, wherein the rotating shaft is configured to rotate on a length direction thereof to open the at least one second penetration aperture when the at least one first penetration aperture is closed and to close the at least one second penetration aperture when the at least one first penetration aperture is opened.

6. The cooling structure of claim 5, wherein the seat and the electronic module are cooled simultaneously when the at least one first penetration aperture is opened, and the electronic module is cooled when the at least one second penetration aperture is opened.

7. The cooling structure of claim 1, wherein when the rotating portion rotates as the predetermined angle after the at least one first penetration aperture is completely opened, the at least one first penetration aperture is closed by the rotating portion.

8. The cooling structure of claim 1, wherein when the rotating portion rotates as the predetermined angle after the at least one second penetration aperture is completely opened, the at least one second penetration aperture is closed by the rotating portion.

9. The cooling structure of claim 1, wherein the upper cover and the rotating portion respectively have cylindrical shapes.

10. The cooling structure of claim 1, wherein the flow path control valve includes:

a lower cover fixedly mounted at a lower end of the upper cover and configured to support a lower end portion of the rotating shaft, wherein the lower cover is coupled to an upper end of the cooling fan module.

* * * * *